(12) United States Patent
Podbielski et al.

(10) Patent No.: US 10,718,380 B2
(45) Date of Patent: Jul. 21, 2020

(54) LAMINATED MECHANICAL COMPONENTS

(71) Applicant: BorgWarner Inc., Auburn Hills, MI (US)

(72) Inventors: David L. Podbielski, Cedar Lake, IN (US); James R. Papania, Boilingbrook, IL (US); Martin P. Keating, Plainfield, IL (US)

(73) Assignee: BorgWarner Inc., Auburn Hills, MI (US)

( * ) Notice: Subject to any disclaimer, the term of this patent is extended or adjusted under 35 U.S.C. 154(b) by 38 days.

(21) Appl. No.: 15/981,534

(22) Filed: May 16, 2018

(65) Prior Publication Data

US 2019/0353204 A1    Nov. 21, 2019

(51) Int. Cl.

| | | |
|---|---|---|
| *F16C 33/14* | (2006.01) | |
| *F16C 17/02* | (2006.01) | |
| *F16C 33/04* | (2006.01) | |
| *B32B 3/04* | (2006.01) | |
| *B32B 3/06* | (2006.01) | |
| *B32B 37/10* | (2006.01) | |
| *B32B 3/26* | (2006.01) | |
| *B32B 15/01* | (2006.01) | |
| *B32B 38/18* | (2006.01) | |

(52) U.S. Cl.
CPC .............. *F16C 33/14* (2013.01); *B32B 3/04* (2013.01); *B32B 3/06* (2013.01); *B32B 3/266* (2013.01); *B32B 15/01* (2013.01); *B32B 37/10* (2013.01); *B32B 38/1808* (2013.01); *F16C 17/02* (2013.01); *F16C 33/046* (2013.01); *F16C 2220/40* (2013.01); *F16C 2226/62* (2013.01); *F16C 2226/76* (2013.01); *F16C 2326/20* (2013.01)

(58) Field of Classification Search
CPC ........ F16C 33/14; F16C 33/046; F16C 17/02; F16C 2326/20; F16C 2220/40; F16C 2226/62; F16C 2226/76; B32B 3/04; B32B 3/06; B32B 3/266; B32B 15/01; B32B 37/10; B32B 38/1808
See application file for complete search history.

(56) References Cited

U.S. PATENT DOCUMENTS

| | | | |
|---|---|---|---|
| 5,208,503 A | 5/1993 | Hisey | |
| 6,575,279 B2* | 6/2003 | Quigley | ................. F16D 41/12 192/107 T |
| 7,478,719 B2* | 1/2009 | Voegele | ................ F16D 13/648 192/107 R |
| 7,677,377 B2 | 3/2010 | Keating | |

(Continued)

*Primary Examiner* — Bayan Salone
(74) *Attorney, Agent, or Firm* — Miller, Matthias & Hull LLP (57) ABSTRACT

Methods and apparatus for manufacturing a circular laminated component are disclosed herein. In one embodiment, a method comprises stamping an inlet stock of material to form a line of arc segments, the line of arc segments having: a plurality of notches along a first edge; a first longitudinal end; and a second longitudinal end opposite the first longitudinal end; wrapping the line of arc segments to form a circular segment having the first edge along an inner-circumferential diameter of the circular segment; joining the first longitudinal end to the second longitudinal end to form a circular laminate layer; and stacking a plurality of circular laminate layers to form a laminate disc.

16 Claims, 8 Drawing Sheets

(56) References Cited

U.S. PATENT DOCUMENTS

| | | | | |
|---|---|---|---|---|
| 7,798,301 B2* | 9/2010 | Keating | ................ | F16D 13/648 |
| | | | | 192/107 R |
| 10,094,431 B2* | 10/2018 | Keating | ................. | F16D 41/12 |
| 2006/0144668 A1* | 7/2006 | Voegele | ............... | F16D 13/648 |
| | | | | 192/107 R |
| 2007/0193847 A1* | 8/2007 | Keating | ............... | F16D 13/648 |
| | | | | 192/107 R |
| 2017/0248176 A1* | 8/2017 | Keating | ................. | F16D 41/12 |

* cited by examiner

LAMINATED MECHANICAL COMPONENTS

TECHNICAL FIELD

The present disclosure generally relates to a method or apparatus of fabricating a variety of laminated mechanical components, such as automotive transmission components, mechanical races for clutches, starters, and the like.

BACKGROUND

Circular-shaped metallic components are frequently used in a variety of mechanical applications. For example, transmissions and clutches use circular mechanical races to selectively transmit torque from a power source (e.g., an engine) to an output (e.g., a vehicle's wheels). Similar shaped components may also be used in starter systems, multi-mode clutches, one-way clutches, and the like.

Manufacturing transmission components using coil or sheet metal by stamping results in low material usage to achieve the desired part geometry or mechanical/physical properties. Stamping multiple parts at once (e.g., nesting), and stamping several smaller components simultaneously or sequentially and interlocking them together to create various geometrical shapes generate a relatively high amount of waste material in the manufacturing of different sizes of transmission apparatuses.

To improve material usage, many different stamping techniques have been developed. Often, the goal is to reduce the quantity of manufacturing byproduct materials that cannot be sold to the customer as part of an end product. Different methods of transferring, positioning, and interlocking the sheet metal components have been employed to stamp and join them together to reduce the amount of material.

U.S. Pat. No. 5,208,503 discloses a method of manufacturing a stator magnetic circuit ring formed by a plurality of interleaved strips of metal. Such a stator includes many desirable attributes for use as an electric stator. The stator is formed by slitting, folding, and shearing only, without any punches or machining operations needed. Such manufacturing methods improve the magnetic flux properties desired for an electric stator. Further, the stator structure is radially elastic, to better maintain a small airgap relative to the rotor-stator airgap.

While these methods may be effective at creating an electric stator, engineers are continuing to seek additional strategies that reduce material wastage when manufacturing high-strength circular mechanical components, particularly for use in engine components. Clearly, there is a need for systems and methods for creating laminated mechanical components.

SUMMARY

In accordance with one aspect of the present disclosure, a method is disclosed. The method comprises: stamping an inlet stock of material to form a line of arc segments, the line of arc segments having a plurality of notches along a first edge, a first longitudinal end, and a second longitudinal end opposite the first longitudinal end; wrapping the line of arc segments to form a circular segment having the first edge along an inner-circumferential diameter of the circular segment; joining the first longitudinal end to the second longitudinal end to form a circular laminate layer; and stacking a plurality of circular laminate layers to form a laminate disc.

In one such embodiment, the first longitudinal end comprises a first interlocking geometry; the second longitudinal end comprises a second interlocking geometry complementary to mating with the first interlocking geometry, and joining the first and second longitudinal ends to form the circular laminate layer comprises mating the first interlocking geometry with the second interlocking geometry.

In another such embodiment, the line of arc segments further comprises at least one pilot hole; and wrapping the line of arc segments further comprises securing the line of arc segments at a pilot hole in proximity to the first longitudinal end and pulling the line of arc segments by the secured pilot hole around a circular tool. In such an embodiment, the method further comprises aligning the pilot holes in the stacked plurality of circular laminate layers and inserting a rivet through the aligned pilot holes.

In another such embodiment, the line of arc segments further comprises at least one dimple that forms a protrusion on one side and a pocket on an opposing side; and stacking the plurality of circular laminate layers comprises aligning a protrusion on a first laminate layer with a pocket of a second laminate layer adjoining the first laminate layer. In such an embodiment, stacking the plurality of laminate layers comprises aligning the joined first and second longitudinal ends of the first laminate layer with the joined first and second longitudinal ends of the second laminate layer. In another such embodiment, stacking the plurality of laminate layers comprises rotationally offsetting the joined first and second longitudinal ends of the first laminate layer with the joined first and second longitudinal ends of the second laminate layer.

In another such embodiment, the line of arc segments further comprises a plurality of cutouts along a second edge opposite of the plurality of notches, the second edge forming an outer circumferential diameter of the circular segment.

The method may further comprise pressing together the laminate disc and finishing an outer circumferential diameter of the laminate disc.

In accordance with another aspect of the disclosure, a laminate disc comprises a plurality of stacked circular laminate layers. Each layer in the plurality of stacked circular laminate layers is formed by: stamping an inlet stock of material to form a line of arc segments, the line of arc segments having: a plurality of notches along a first edge; a plurality of cutouts along a second edge that opposes the first edge, the plurality of cutouts located opposite of the plurality of notches; at least one pilot hole; a first longitudinal end; and a second longitudinal end opposite the first longitudinal end; forming the line of arc segments into a circular segment at least in part by: securing the line of arc segments at a pilot hole located in proximity to the first longitudinal end; and pulling the line of arc segments by the secured pilot hole around a circular tool such that the first edge forms an inner-circumferential diameter of the circular segment and the second edge forms an outer-circumferential diameter of the circular segment; and joining the first longitudinal end to the second longitudinal end to form a circular laminate layer.

In one such embodiment, the line of arc segments further comprises at least one dimple that forms a protrusion on one side and a pocket on an opposing side; wherein: a protrusion on a first circular laminate layer aligns with a pocket on a second circular laminate layer adjoining the first circular laminate layer; and a pilot hole of the first circular laminate layer aligns with a pilot hole of the second circular laminate layer, such that the aligned pilot holes are configured to receive a fastener. In one such embodiment, the joined first and second longitudinal ends of the first circular laminate layer are rotationally offset from the joined first and second longitudinal ends of the second circular laminate layer. The laminate disc may further comprise a finished outer surface.

In yet another embodiment, a method comprises: stamping an inlet stock of material to form a line of arc segments, the line of arc segments having: a plurality of notches along a first edge; a plurality of cutouts along a second edge opposing the first edge, the plurality of cutouts located opposite of the plurality of notches; at least one pilot hole; at least one dimple that forms a protrusion on one side of the line of arc segments and a pocket on an opposing side of the line of arc segments; a first longitudinal end; and a second longitudinal end opposite the first longitudinal end and mateable with the first longitudinal end; securing the line of arc segments at a pilot hole located in proximity to the first longitudinal end; pulling the line of arc segments around a circular tool to form a circular segment, such that the first edge forms an inner-circumferential diameter of the circular segment and the second edge forms an outer-circumferential diameter of the circular segment; mating the first longitudinal end to the second longitudinal end to form a circular laminate layer; stacking a plurality of circular laminate layers by aligning a protrusion on a first laminate layer with a pocket of a second laminate layer; joining the stacked plurality of circular laminate layers to form a laminate disc; and finishing an outer diameter of the laminate disc at least in part by notching a saw-tooth pattern on the outer diameter of the laminate disc.

These and other aspects and features of the present disclosure will be more readily understood when read in conjunction with the accompanying drawings.

DETAILED DESCRIPTION

Figure 1:
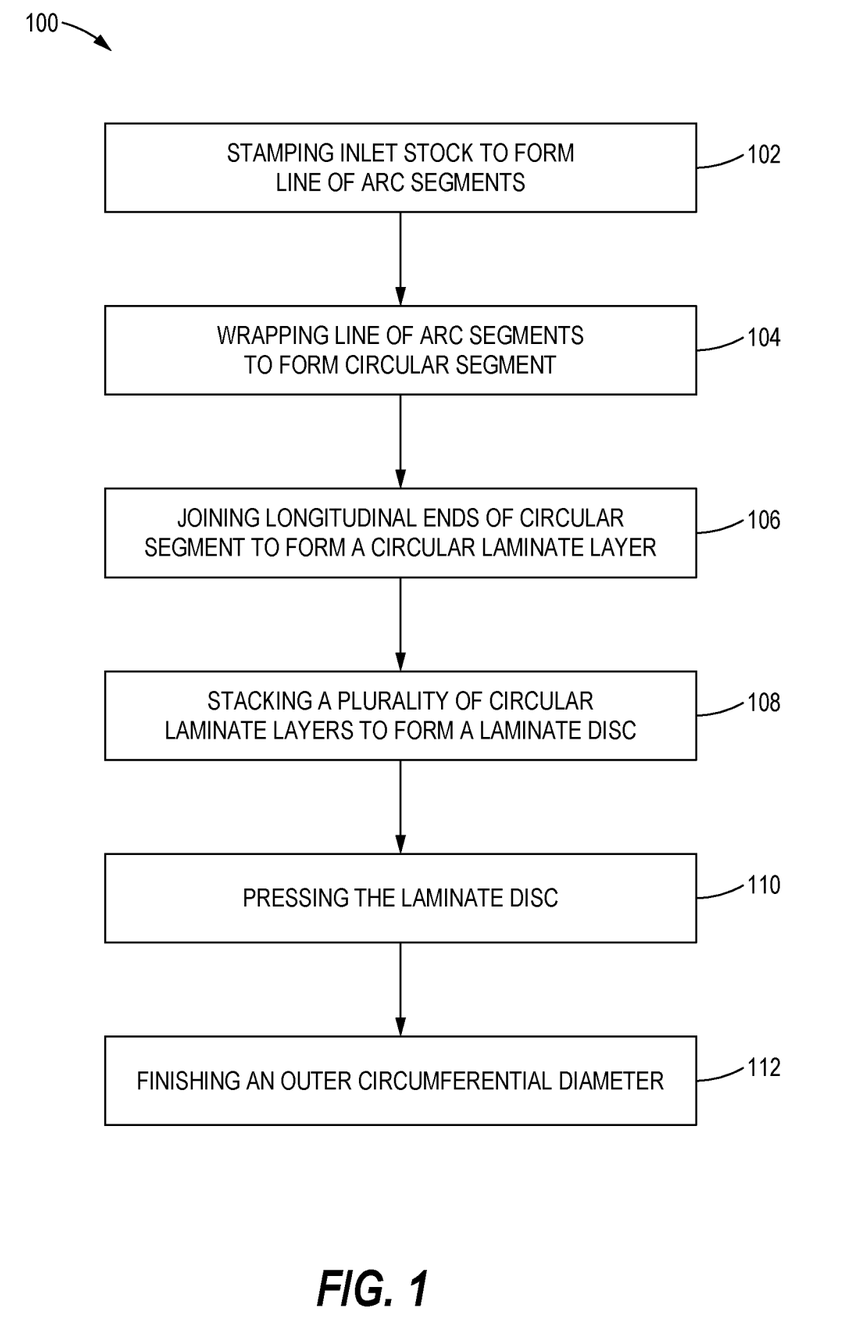
FIG. 1 depicts a first method, in accordance with an embodiment.

Referring now to the drawings, and with specific reference to FIG. 1, certain aspects of a method are depicted. In particular, FIG. 1 depicts the method 100 that includes stamping an inlet stock to form a line of arc segments at block 102, wrapping a line of arc segments to form a circular segment at block 104, joining the longitudinal ends of the circular segment to form a circular laminate layer at block 106, stacking a plurality of circular laminate layers to form a laminate disc at block 108, pressing the laminate disc at block 110, and finishing an outer circumferential diameter at block 112. Although depicted in series, the aspects of the method 100 may be performed in a different order by one with ordinary skill in the art. For example, the finishing of the outer circumferential diameter of block 112, may occur before pressing the laminate disc at block 110. Further, additional aspects may be added to—either before, during, or after—or removed from the depicted aspects of the method 100.

Aspects of method 100 are briefly discussed herein, and will be explained in more detail throughout the detailed description, in particular, in conjunction with the detailed description of FIGS. 2-7. At block 102, an inlet stock 202 of material is stamped to form a line of arc segments 204. The material of the inlet stock 202 may be selected from any suitable material to achieve the desired properties of the final finished product. Non-limiting examples of material types include steel, stainless steel, sheet metal, aluminum, plastics, and the like. The inlet stock 202 has a nominally rectangular geometry having a length, a width, and a thickness. As depicted in the view 200, the length dimension is depicted by a measurement from the left to the right, a width dimension is depicted by a measurement from the top to the bottom, and a thickness dimensions depicted by a measurement into the page. The inlet stock 202 may initially be a linear piece, or it may initially be coiled and flattened before stamping at block 102.

Figure 2A:
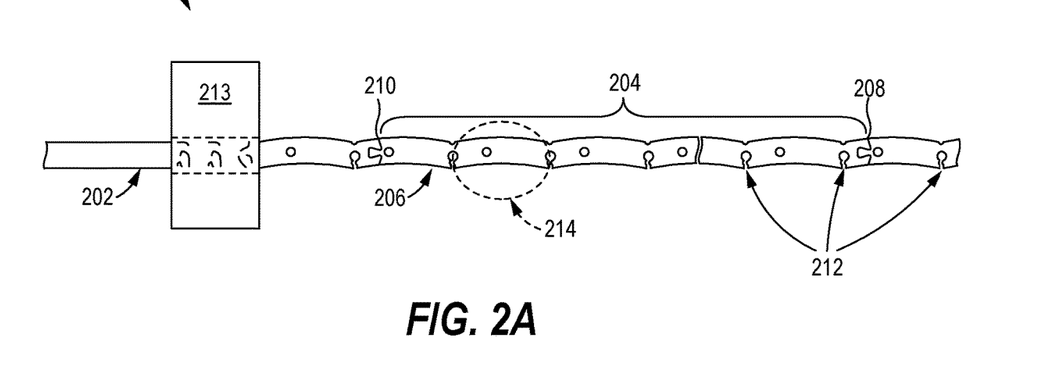
FIG. 2A depicts a top view of a manufacturing process, in accordance with an embodiment.

The length of the inlet stock 202 may be at least as long as a single line of arc segments 204, several meters long, a multiple of the length of a single line of arc segments, or the like. The width of the inlet stock 202 is selected based on a desired radial thickness (as measured as the difference between the radial distance of the outer circumferential diameter to the radial distance of the inner circumferential diameter) of the laminate disc 232. Nominal width dimensions range between 10 mm to 50 mm, although other widths may be used. The height of the inlet stock 202 is selected based on a desired thickness of the circular laminate layers 224. Nominal height dimensions range between 0.5 mm to 5 mm, although other height dimensions may be used.

The inlet stock 202 is stamped to form a line of arc segments 204. The line of arc segments 204 includes a plurality of notches 212 along a first edge 206, a first longitudinal end 208, and a second longitudinal end 210 opposite the first longitudinal end 208. The notches 212 in the plurality of notches are spaced apart at equal distances along the length of the line or arc segments 204 along the first edge 206. Thus, a single arc segment 214 in the line of arc segments 204 is defined as the material located between successive notches 212, as depicted by the dotted circle around the arc segment 214. The number of arc segments 214 in the line of arc segments 204 is selected based on a degree of bending between each arc segment 214 as it is wrapped to form the circular segment (block 104). For example, a line of arc segments 204 with ten arc segments 214 would represent thirty-six (36) degrees of bend through each arc segment 214. A line of arc segments 204 with twenty (20) arc segments 214 would represent eighteen (18) degrees of bend through each arc segment 214. Thus, a higher number of arc segments 214 in the line of arc segments 204 will result in less bending between each arc segment 214 and a closer approximation to a true circular shape for the circular segments and circular laminate layers.

Figure 2B:
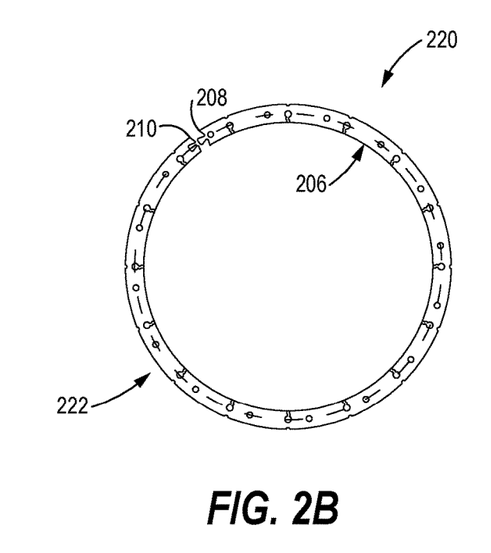
FIG. 2B depicts a top view of a circular segment, in accordance with an embodiment.

In one embodiment, a line of arc segments includes a first portion of an arc segment 214 between the first longitudinal end 208 and an initial notch 212, followed by a plurality (e.g., fifteen) arc segments 214, followed by a second portion of an arc segment 214 between a final notch 212 and the second longitudinal end 210. In such an embodiment, the first portion of the arc segment 214 and the second portion of the arc segment 214 may be combined to make up the effective length of a single arc segment 214. Thus in such an embodiment, the line of arc segments 204 has an effective length of sixteen (16) arc segments 214, with ½ from the first portion of arc segment+15 arc segments+½ from the second portion of arc segment. When wrapped (block 104) to form the circular segment 222, the first portion of the arc segment will be adjacent to the second portion of the arc segment, with the longitudinal ends (208, 210) being joined (at block 106) to form the circular laminate layer 224.

At block 104, the line of arc segments 204 is wrapped to form a circular segment 222. The first edge 206, having the notches 212, forms the inner-circumferential diameter of the circular segment 222. At block 106, the first longitudinal end 208 is joined with the second longitudinal end 210 to form a circular laminate layer 224. In some embodiments, joining the first and second longitudinal ends (208, 210) comprises welding the ends together, joining the ends with an adhesive, mating complementary locking geometries together, and the like.

Figure 2C:
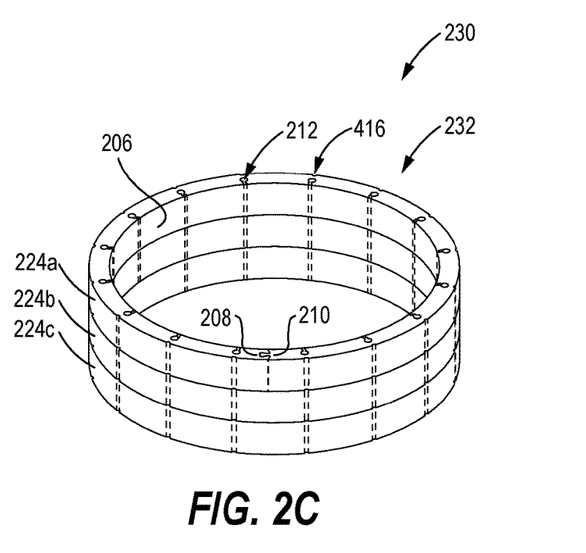
FIG. 2C depicts a perspective view of a laminate disc, in accordance with an embodiment.

At block 108, a plurality of circular laminate layers 224 are stacked to form a laminate disc 232. Each of the stacked laminate layers 224 may be identical to each other (e.g., stamped from the same tool) or they may have differences in locations of various features (e.g., changes in locations or dimensions of notches, recesses, dimples, pilot holes, and the like.) Further, different layers may be added throughout the laminate disc 232. For example, either one or both of the top and bottom laminate layers may be distinct from the middle laminate layer 224. The top and/or bottom layers of the disc may be optimized to receive a fastener to be inserted through pilot holes of the middle layers, have a distinct top or bottom exterior surface, or the like.

The number of circular laminate layers 224 in the laminate disc 232 is selected based on a desired thickness of the laminate disc 232. In one embodiment, a thickness of the inlet stock 202 is 1 mm and twenty (20) circular laminate layers 224 are stacked to form the laminate disc 232. Thus, the thickness of the resulting laminate disc 232 is approximately twenty (20) mm. In some embodiments, the number of circular laminate layers 224 ranges from two (2) to several dozen layers.

At block 110, the laminate disc may be pressed together. The laminate disc may be pressed by a tandem press or the like. At block 112, an outer circumferential diameter of the laminate disc 232 is finished. Finishing the outer circumferential diameter may comprise smoothing the outer diameter to form a smooth circular shape. The smoothing may be accomplished by grinding, polishing, sanding, or the like. In other embodiments, finishing the outer circumferential diameter may comprise machining a saw-tooth pattern on the outer circumferential diameter.

Finishing of the outer circumferential diameter (block 112) may occur on each of the circular laminate layers 224 individually before being stacked, on the stack of circular laminate layers 224 before pressing (block 110), on the laminate disc 232 after pressing (block 110), or at multiple different times in the manufacturing process.

FIG. 2A depicts a top view of a manufacturing process, in accordance with an embodiment. In particular, FIG. 2A depicts the view 200 that includes inlet stock 202, a stamping tool 213, and a line of arc segments 204. The line of arc segments 204 has a first longitudinal end 208, a plurality of notches 212 along a first edge 206, and a second longitudinal end 210. Aspects of the method 100 are depicted in the view 200. For example, the inlet stock 202 is provided to the stamping tool 213 to performing the stamping of block 102. The stamping tool 213 may stamp each of the notches 212 along the first edge 206, implement a stamp to realize the first and second longitudinal ends (208, 210) between the successive lines of arc segments 204, and the like.

In other embodiments, the stamping tool 213 may also stamp the interlocking geometries, the recesses, the pilot holes, the dimples, and the like, as discussed in more detail throughout the remainder of the description. In the view 200, the stamping tool converts the inlet stock 202 into a continuous length successive lines of arc segments 204. However, one with skill in the art may appreciate that a piece of inlet stock 202 may be converted into a single line of arc segments 204 or a multitude of lines of arc segments 204 until the inlet stock 202 is exhausted.

FIG. 2B depicts a top view of a circular segment, in accordance with an embodiment. In particular, FIG. 2B depicts the view 220 that includes a circular segment 222. In the view 220, a line of arc segments 204 has been wrapped (block 104) to form a circular segment 222. As depicted, an inner circumferential diameter of the circular segment 222 is formed by the first edge 206. The first longitudinal end 208 is adjacent to the second longitudinal end 210. The first and second longitudinal ends (208, 210) may be joined (block 106) to form a circular laminate layer 224.

FIG. 2C depicts a perspective view of a laminate disc, in accordance with an embodiment. In particular, FIG. 2C depicts the view 230 of a laminate disc 232. The laminate disc 232 comprises a plurality of stacked laminate layers 224. By way of example, the laminate disc 232 depicted in view 230 includes three laminate layers, with laminate layer 224a on top, laminate layer 224b in the middle, and laminate layer 224c on the bottom.

Figure 3A:
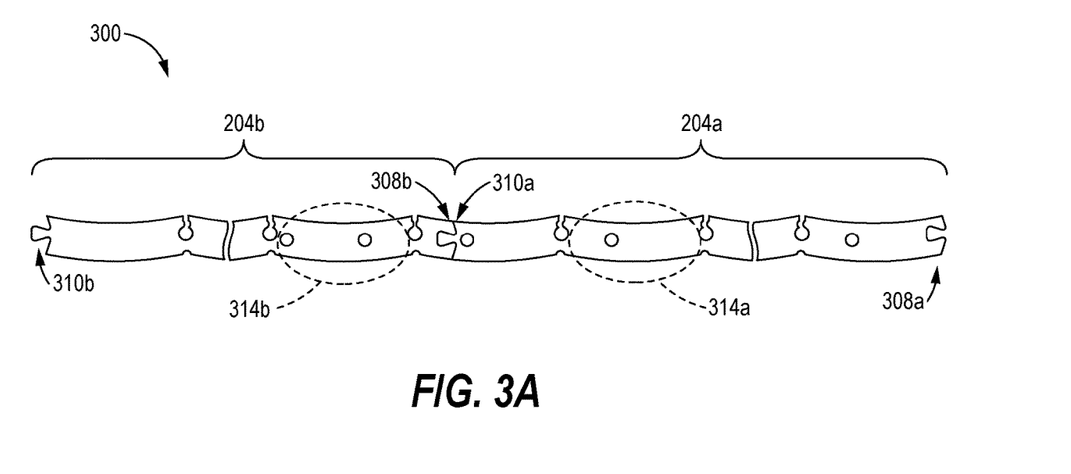
FIG. 3A depicts a top view of a plurality of lines of arc segments, in accordance with an embodiment.

FIG. 3A depicts a top view of a plurality of lines of arc segments, in accordance with an embodiment. In particular, FIG. 3A depicts the view 300 having a first line of arc segments 204a and a second line of arc segments 204b. As depicted in the view 300, the first line of arc segments 204a has a first longitudinal end 308a, a second longitudinal end 310a, and a plurality of arc segments 314a. The second line of arc segments 204b includes a first longitudinal end 308b, a second longitudinal end 310b, and a plurality of arc segments 314b. The second longitudinal end 310a of the first line of arc segments 204a is in close proximity to a first longitudinal end 308b of the second line of arc segments 204b. In such a view, the inlet stock 202 has been stamped (block 102) into a plurality of successive lines of arc segments (204a, 204b) and still retains a straight and rectangular shape, as it has not yet been wrapped (block 104).

At this stage of manufacturing, the longitudinal ends (310a, 308b) between the lines of arc segments (204a, 204b)

may not yet be physically separated. For example, the line of arc segments may be cut, or unmated, to separate the lines of arc segments (204a, 204b) just before wrapping (block 104). In other embodiments, the lines of arc segments 204 may be separated by a stamping (block 102) that creates a first and second interlocking geometry (322, 324) on the first and second longitudinal ends (308, 310). The first and second longitudinal ends (308b, 310a) may stay in a mated condition as the material leaves the stamping tool 213 and proceeds to be wrapped (block 104). Maintaining physical integrity between the lines of arc segments 204 permits a single attachment point along the lines of arc segments 204 to advance material between the stamping and wrapping aspects of the manufacturing processes.

Figure 3B:
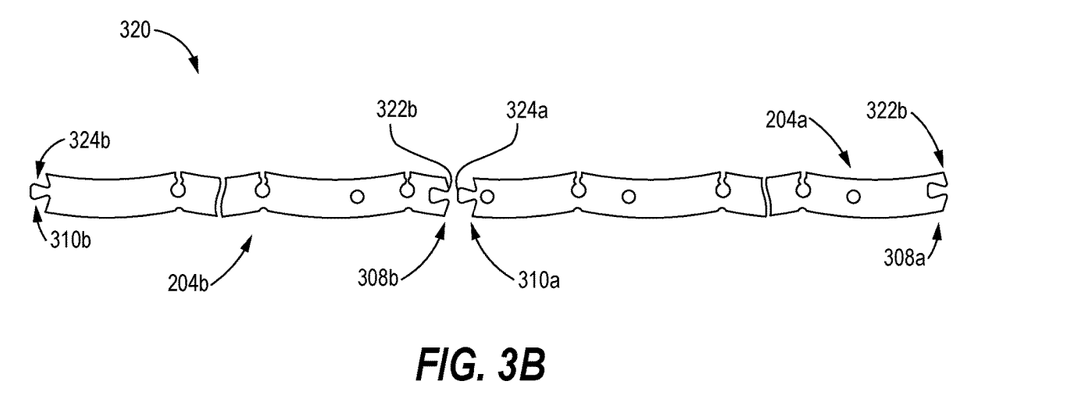
FIG. 3B depicts a top view of a plurality of lines of arc segments in an unmated condition, in accordance with an embodiment.

FIG. 3B depicts a top view of two lines of arc segments in an unmated condition, in accordance with an embodiment. In particular, FIG. 3B depicts the view 320 that includes the second longitudinal end 310a having a first interlocking geometry 324a and the first longitudinal end 308b having a second interlocking geometry 322b. The first interlocking geometry 322 is complementary to be mated, or snapped, into the second interlocking geometry 324. As depicted, the first line of arc segments 204a is unmated from the second line of arc segments 204b. In some embodiments, the lines of arc segments 204 remain mated until just before being wrapped (block 104).

Figure 3C:
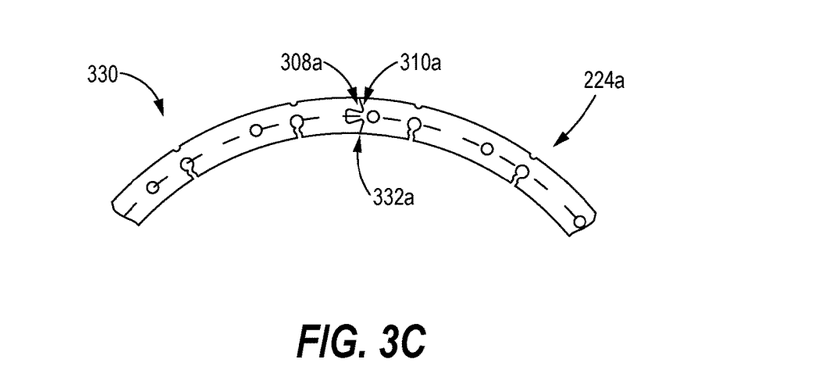
FIG. 3C depicts a top view of a portion of a circular laminate layer, in accordance with an embodiment.

FIG. 3C depicts a top view of a portion of a circular laminate layer, in accordance with an embodiment. In particular, FIG. 3C depicts the view 330 that includes a portion of the circular laminate layer 224a. In the view 330, the line of arc segments 204a from FIG. 3B has been wrapped (block 104) to form the circular segment (222a) and the longitudinal ends (310a, 308a) have been joined to form the circular laminate layer 224a. As depicted, the interlocking geometries (322a, 324a) from the line of arc segments 204a are now joined at a mating 332a. Although not depicted, the line of arc segments 204b of FIG. 3B may also be wrapped (block 104) and its ends joined (block 106) to form a circular laminate layer 224b. Each of the laminate layers (224a, 224b), or any number of laminate layers 224, may be stacked (block 108) to form a laminate disc, such as the laminate disc 232 depicted in FIG. 2C.

Figure 4:
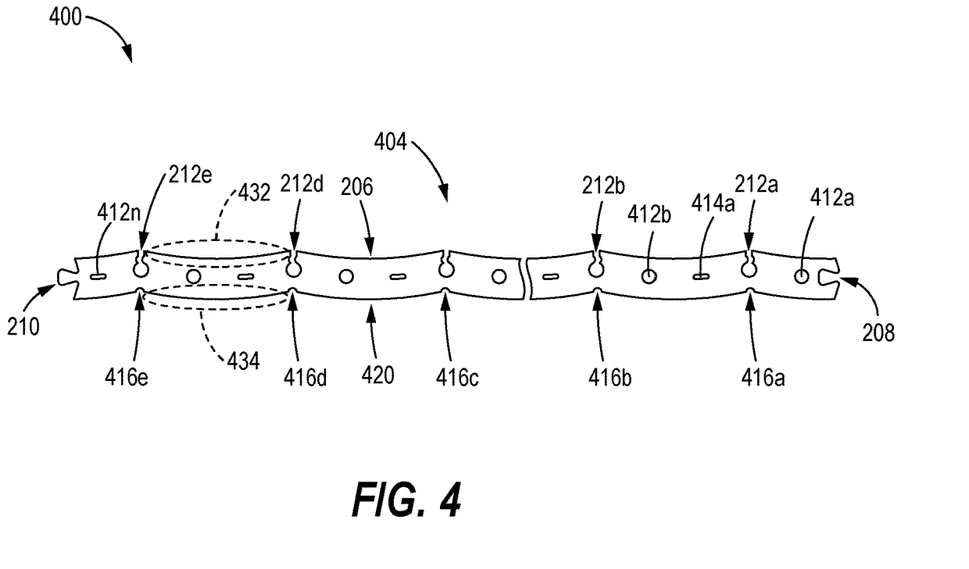
FIG. 4 depicts a top view of a line of arc segments, in accordance with an embodiment.

FIG. 4 depicts a top view of a line of arc segments, in accordance with an embodiment. In particular, FIG. 4 depicts the view 400 that includes a line of arc segments 404. The line of arc segments 404 is similar to the line of arc segments 204, and further includes at least one pilot hole 412a, and at least one dimple 414a. The line of arc segments 404 further includes a second edge 420 that is opposite of the first edge 206. Along the second edge 420 are a plurality of cutouts 416. The cutouts 416 may be located opposite of the notches 212. For example, the notch 212a may be located across from the cutout 416a, and the notch 212b is located across from the cutout 416b. The cutouts 416 help reduce bulging and puckering of the laminate layers 224 during the wrapping (block 104) process. The cutouts 416 may be stamped into the line of arc segments 204 by the stamping tool 213.

The line of arc segments 404 depicted in view 400 may also include at least one pilot hole 412. Here, the pilot hole 412a is located in close proximity to the first longitudinal end 208. As discussed in more detail herein, the pilot hole 412 may serve multiple purposes during the manufacturing process. In one embodiment, the pilot hole 412a, located in close proximity to the first longitudinal end 208, serves as a point of attachment by a tool to assist in the wrapping (block 104) aspect of the manufacturing. For example, a tool may be inserted through the pilot hole 412a as the line of arc segments 404 is wrapped to form the circular segment 222. The inserted tool may impart a tension force on the line of arc segments 404 as it is pulled around a circular tool (952). Further, the pilot holes 412 may align from one layer to an adjacently stacked layer in a laminate disc 232. The aligned pilot holes are configured to receive a fastener, such as a rivet, screw, bolt, or the like, to join the stacked layers.

In another embodiment, the line of arc segments 404 comprises pilot holes 412 located along the length of the line of arc segments 404. Each arc segment in the line of arc segments 404 may have a pilot hole 412, or the pilot holes (412a, 412b, etc.) may be placed in every other arc segment, every third arc segment, or the like. The pilot holes 412 may be circular in shape. However, other shapes such as a square, an oval, a rectangle, an irregular polygon, or the like may be used. The pilot holes 412 may be stamped or punched into the inlet stock 202 by the stamping tool 213, or by a separate machine configured to punch the pilot holes 412. When multiple laminate layers 224 are stacked, a protrusion of one dimple 414 (discussed in more detail below) may nest into the pocket of a dimple 414 from an adjacently stacked layer. Thus, the dimples assist in rotationally aligning the laminate layers 224 to align the pilot holes 412 of different laminate layers 224 as they are stacked to form the laminate disc 232.

The line of arc segments 404 depicted in the view 400 may further include at least one dimple 414. A dimple 414 is formed as a semi-curser that forms a protrusion on one side of the line of arc segments 404 and a pocket on the opposing side. The dimple 414 is distinguished from the pilot hole 412 at least in part because the dimple deforms a top and bottom surface of the line of arc segments, rather than a pilot hole removing material and being flush with the top and bottom surfaces of the laminate layer 224. The semi-curser does not break the integrity of the material, but deforms it by creating the protrusion and the pocket. As depicted in the view 400, the dimples 414 are oval, or oblong shaped. However, one with skill in the art may select any suitable shape for the dimples 414. Similar to the pilot holes 412, additional dimples (414a, 414b, etc.) may be added along the length of the line of arc segments 404. For example, each arc segment may have one dimple 414, every other arc segment may have one dimple, or the like.

In one embodiment, the aspects of both a dimple and a pilot-hole are combined and realized with a single manufacturing operation. In such an embodiment, a hole is punched through the laminate layer, resulting in the removal of material in a circular or oval shape across a first diameter. This punching process may also deform the material in the vicinity of the hole, causing the dimple effect around the hole. The dimple effect would be located between a first diameter measurement and a second larger diameter measurement. In such an embodiment with multiple laminate layers having a combined pilot hole/dimple, this feature aligns in successive layers and allows for insertion of fasteners through these holes.

The line of arc segments 404 may further have additional material removed from the first and second edges (206, 420) to better approximate a circular shape after wrapping. For example, at 432, material is removed along the first edge 206 between the notches 212d and 212e to cause an arc shape. A smaller amount of material is removed near the notches 212d and 212e and a greater amount of material is removed near the center-point between the notches 212d and 212e. Similarly, at 434, material is removed along the second edge 420 between the cutouts 416d and 416e to cause an arc shape, with a smaller amount of material being removed near the center-point between the notches 212d and 212e and a greater amount of material being removed near the notches 212d and 212e. The shaping (432) of the first edge 206 and the shaping (434) of the second edge 420 may be placed on each of the arc segments in the line of arc segments 404 by the stamping tool 213.

Figure 5:
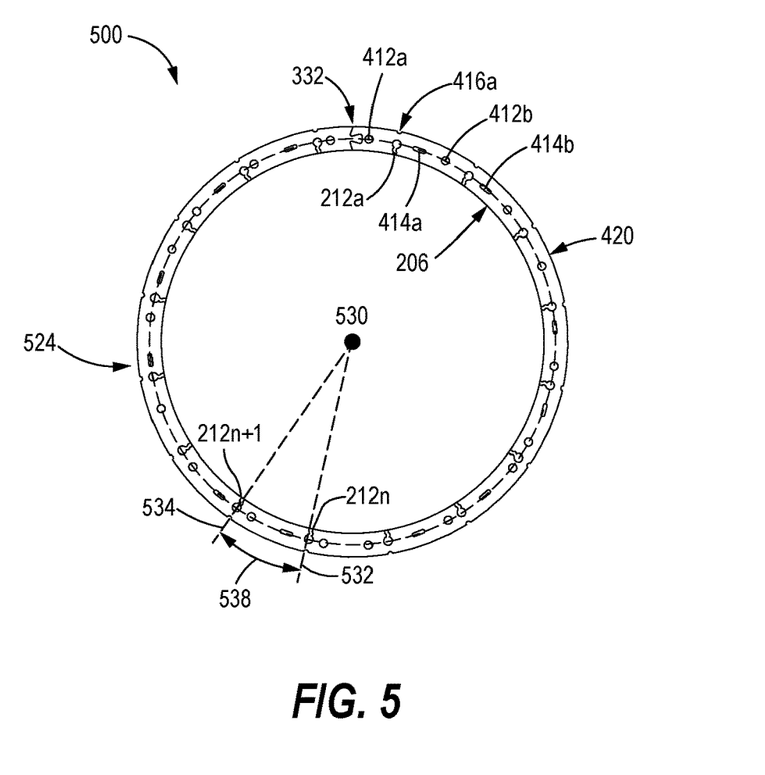
FIG. 5 depicts a top view of a circular laminate layer, in accordance with an embodiment.

The line of arc segments 404 depicted in FIG. 4 may have any number of arc segments, but by way of example and for discussion in conjunction with FIG. 5, the line of arc segments 404 comprises fifteen (15) complete arc segments and two (2) partial arc segments on each end to combine to a total effective length of sixteen (16) arc segments. Each longitudinal end (208, 210) comprises an interlocking geometry (322, 324) that are complementary to mating with each other to form the mated ends 332.

FIG. 5 depicts a top view of a circular laminate layer, in accordance with an embodiment. In particular, FIG. 5 depicts the view 500 of the circular laminate layer 524 that is similar to the circular laminate layer 224. The circular laminate layer 524 is formed by wrapping (e.g., block 104) the line of arc segments 404 from FIG. 4 to form a circular segment (e.g., 222) and joining (e.g., block 106) the longitudinal ends (208, 210) (e.g., by mating the interlocking geometries 324a and 324a into the mated ends 332a.) For reference, the view 500 includes a center point 530, radial line 532 that extends through the notch 212n, the radial line 534 that extends through the notch 212n+1, and a circular arc measurement 538. These features may be used to describe a portion of a complete circle that a single arc segment may extend through. Here, the notches 212n and 212n+1 define a single arc segment in a line of arc segments 404. With a line of arc segments 404 comprising an effective length of sixteen (16) arc segments, each arc segment produces a circular arc measurement 538 of approximately 22.5 degrees (360 degrees in a complete circle/16 arc segments).

The second edge 420 having the cutouts 416 makes up the outer circumferential diameter of laminate layer 524, and the first edge 206 having the notches 212 makes up the inner circumferential diameter of the laminate layer 524.

Figure 6A:
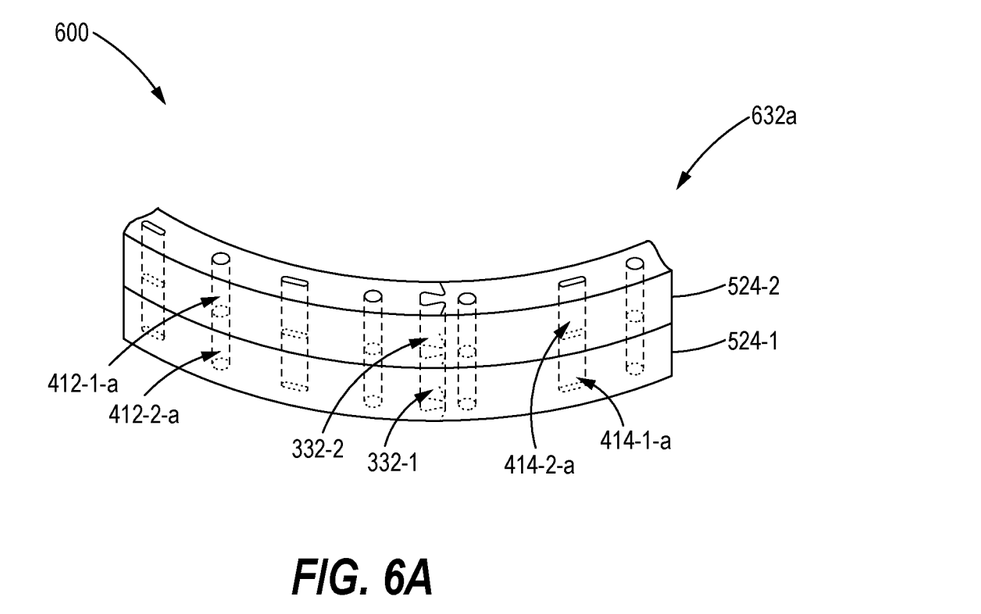
FIG. 6A depicts a perspective view of a portion of a first laminate disc, in accordance with an embodiment.

FIG. 6A depicts a perspective view of a portion of a first laminate disc, in accordance with an embodiment. In particular, FIG. 6A depicts the view 600 of the laminate disc 632a, which may be similar to the laminate disc 232. The laminate disc 632a includes two laminate layers 524, with laminate layer 524-1 on the bottom and 524-2 on the top. The laminate layer 524-1 includes a dimple 414-1-a, mated ends 332-1, and a pilot hole 412-1-a. The laminate layer 524-2 includes a dimple 414-2-a, mated ends 332-2, and a pilot hole 412-2-a.

Here, when the laminate layers (524-1, 524-2) are stacked, and the dimple 414-1-a is aligned and nested with the dimple 414-2-a (e.g., a protrusion of dimple 414-1-a is nested into a pocket of dimple 414-2-a) of the adjoining laminate layer. Further, the pilot holes 412-1-a and 412-2-a are aligned, such that they are configured to receive a fastener. Finally, the mated ends 332-1 and 332-2 are also aligned, with no rotational offset between the laminate layers (524-1, 524-2).

Figure 6B:
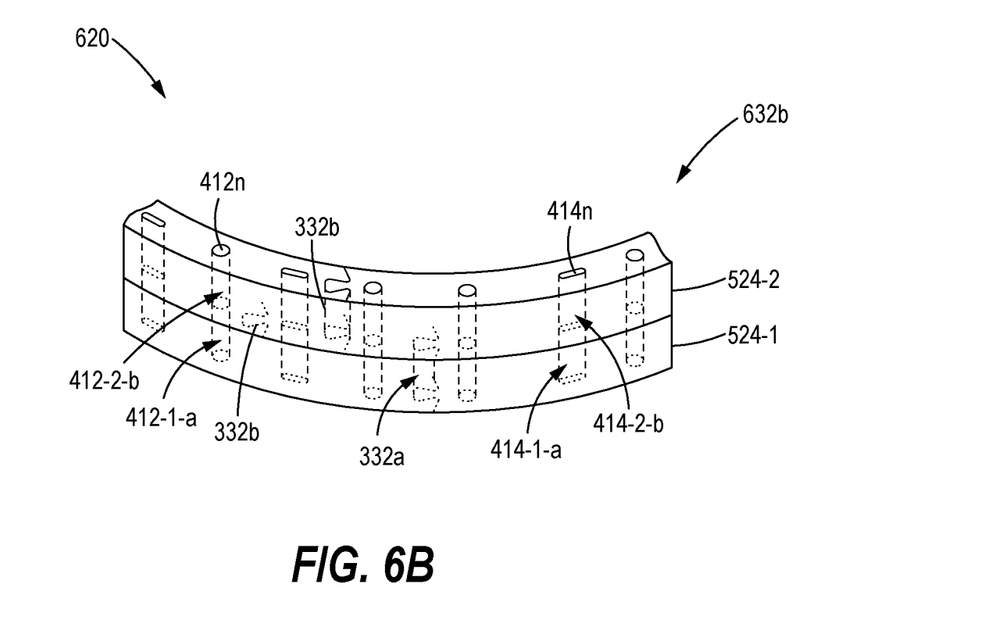
FIG. 6B depicts a perspective view of a portion of a second laminate disc, in accordance with an embodiment.

FIG. 6B depicts a perspective view of a portion of a second laminate disc, in accordance with an embodiment. In particular, FIG. 6B depicts the view 620 of the laminate disc 632b. The laminate disc 632b is similar to the laminate disc 632a, however, the laminate layer 524-1 is rotationally offset from the adjoining laminate layer 524-2. By way of example, the laminate layers (524-1, 524-2) in the laminate disc 632b are rotationally offset from each other by a rotational offset corresponding to the length of a single arc segment, here, 22.5 degrees. In such an example, the mated ends 332-1 are not vertically aligned with the mated ends 332-2 due to the rotational offset. However, pilot holes 412 and dimples 414 in adjoining laminate layers 524 may still be aligned. To support such alignment, each line of arc segments 404 comprises a plurality of pilot holes 412 and dimples 414, perhaps a single pilot hole 412 and dimple 414 along each arc segment in the line of arc segments 404. Thus, a pilot hole 412-1-a (e.g., the first pilot hole 412 located in proximity to the first longitudinal end 208) of the first laminate layer would align with a pilot hole 412-2-b (e.g., the pilot hole 412 located in proximity to the second longitudinal end 210) of the second laminate layer. Similarly, the dimple 414-1-a (e.g., a dimple 414 located in close proximity to the first longitudinal end 208) would align and nest with the dimple 414-2-b (e.g., a dimple 414 that is located in an arc segment adjacent to the arc segment having the dimple 414-2-a).

However, one with skill in the art may appreciate utilizing different rotational offsets between the laminate layers 524. For example, each adjoining laminate layer may be rotationally offset by approximately 120 degrees. In such an embodiment, each laminate layer may be offset a rotational distance associated with five (5) arc segments of the total sixteen (16) arc segments (approximately 112.5 degrees). Thus a second layer would result in a rotational offset of $5/16$ths, a third layer would result in a rotational offset of $10/16$ths, a fourth layer would result in a rotational offset of $15/16$ths, a fifth layer would result in a rotational offset of $4/16$ths from the base layer, and so on.

Of note, the laminate layers depicted in FIGS. 2C, 6A, and 6B may not be to scale, in some embodiments. For example, the height (e.g., thickness) of each laminate layer may be exaggerated to more clearly depict various aspects of the components.

Figure 7A:
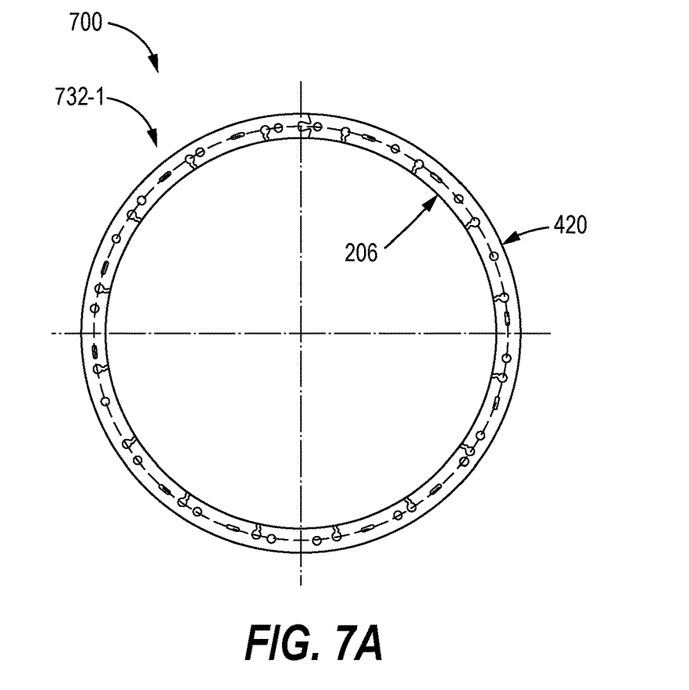
FIG. 7A depicts a view of a first finished laminate disc, in accordance with an embodiment.

FIG. 7A depicts a top view of a first finished laminate disc, in accordance with an embodiment. In particular, FIG. 7A depicts the view 700 of the laminate disc 732-1. The laminate disc 732-1 comprises a finished outer circumferential diameter with a smooth finish. Each of the cutouts 416 along the second edge 420 have been smoothed to form a smooth and circular surface along the outer circumferential diameter. The smooth may be achieved by grinding, sanding, machining, or the like.

Figure 7B:
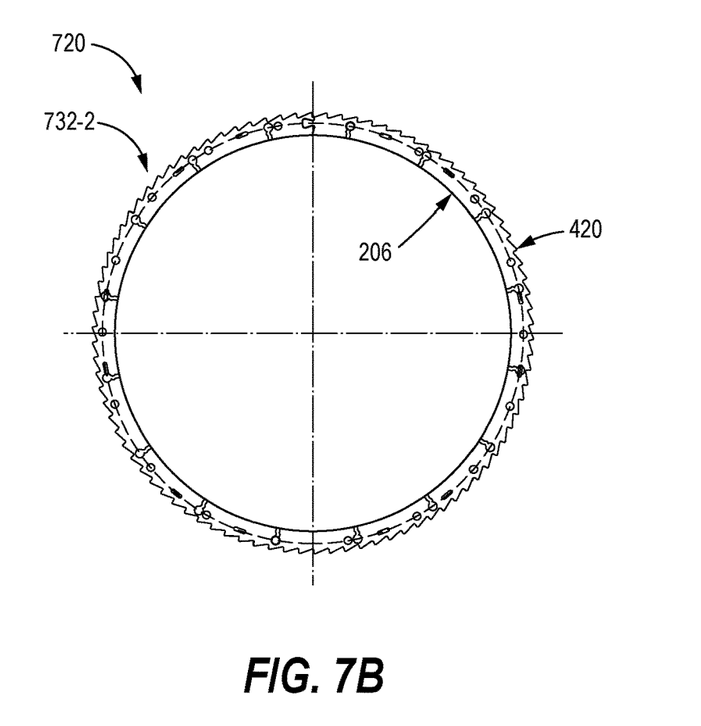
FIG. 7B depicts a view of a second finished laminate disc, in accordance with an embodiment.

FIG. 7B depicts a top view of a second finished laminate disc, in accordance with an embodiment. In particular, FIG. 7B depicts the view 720 of the laminate disc 732-2. The laminate disc 732-2 comprises a finished outer circumferential diameter with a saw-tooth finish. In addition to the cutouts 416 being removed, the outer diameter includes a saw-tooth finish that may operate with a ratchet pawl, in some embodiments. The saw-tooth finish may be achieved by grinding, sanding, machining, or the like.

In various embodiments, the features and aspects of the circular discs disclosed herein may combined in a variety of ways to form circular laminate components for use in many different industries.

INDUSTRIAL APPLICABILITY

In general, the teachings of the present disclosure may find broad applicability in many industries including, but not limited to, automotive, single-track vehicle, marine, electronic, and transportation industries. In particular, the present disclosure may find applicability in any industry using machines or equipment that include circular discs. Disclosed herein are a method and apparatus for manufacturing circular discs, in accordance with an embodiment of the disclosure. In addition to the method 800 of FIG. 8 and the apparatus 900 of FIG. 9, different aspects of the components of the circular disc discussed in relation to the FIGS. 1-7 will also be referred to herein, as appropriate.

Figure 8:
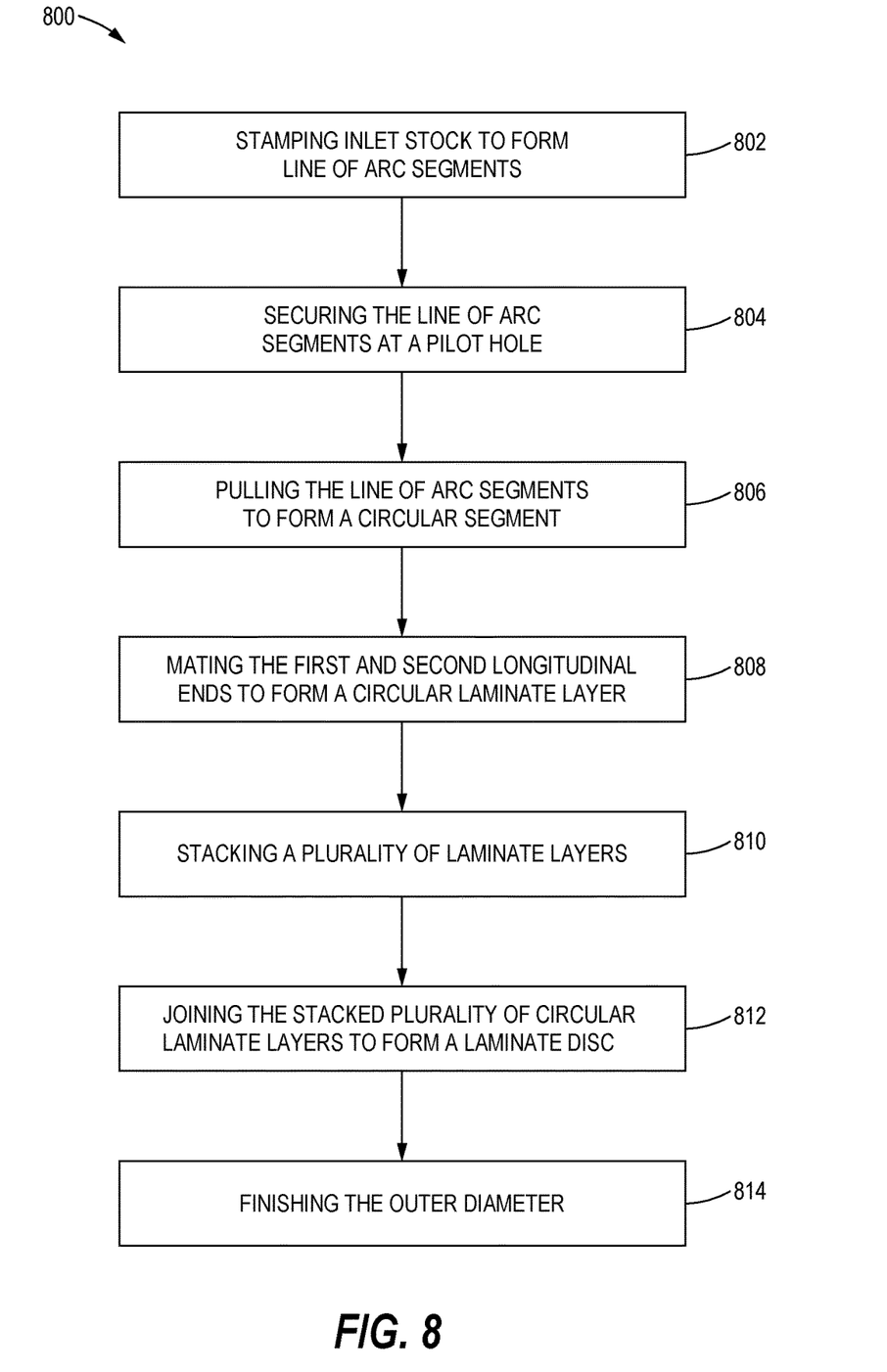
FIG. 8 depicts a second method, in accordance with an embodiment.

FIG. 8 depicts a second method, in accordance with an embodiment. In particular, FIG. 8 depicts the method 800 that includes stamping inlet stock to form a line of arc segments at block 802, securing the line of arc segments at a pilot hole at block 804, pulling the line of arc segments to form a circular segment at block 806, mating the first and second longitudinal ends to form a circular laminate layer at 808, stacking a plurality of laminate layers at block 810, joining the stacked plurality of circular laminate layers to form a laminate disc at block 812, and finishing the outer diameter at 814.

Figure 9:
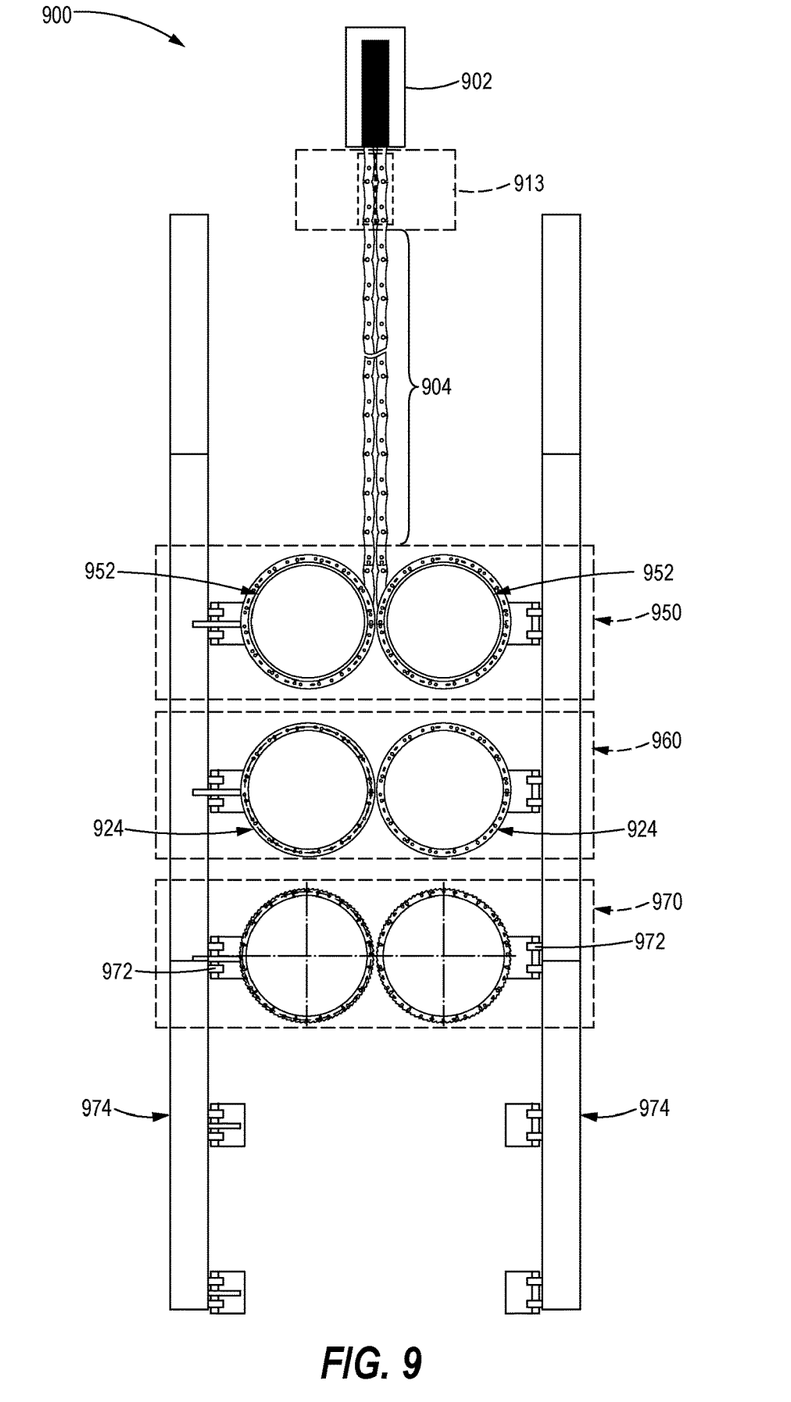
FIG. 9 depicts an apparatus for manufacturing a laminate disc, in accordance with an embodiment.

FIG. 9 depicts an apparatus for manufacturing a laminate disc, in accordance with an embodiment. In particular, FIG. 9 depicts the apparatus 900 which may be used to accomplish the method 800. The apparatus 900 depicts the inlet stock 902, similar to the inlet stock 202, entering the stamping tool 913. The stamping tool 913, which may be similar to the stamping tool 213, is configured to stamp the inlet stock 902 to form (block 802) the line of arc segments 904, which may be similar to the line of arc segments 204 or 404. The line of arc segments 904 may include the various features disclosed herein, such as notches 212, cutouts 416, pilot holes 412, dimples 414, and first and second interlocking geometries (322, 324) at the first and second longitudinal ends (208, 210), respectively.

At block 804, a portion of the wrapping tool 950 secures the line of arc segments 904 by a pilot hole 412. The secured pilot hole 412 may be in close proximity to the first longitudinal end 208 of the line of arc segments 904. As the line of arc segments 904 exits the stamping tool 913 and heads to the wrapping tool 950, the first and second interlocking geometries (322, 324) may remain in a mated condition, such as depicted in the view 300 of FIG. 3A.

At block 806, the line of arc segments 904 is pulled around a circular tool 952 of the wrapping tool 950. As the pilot hole 412 is secured and is about to be pulled around the circular tool 952, the interlocked geometries between successive lines of arc segments may be broken apart, such as depicted in the view 320 of FIG. 3B. The line of arc segments 904 is then pulled around the circular tool 952 to form the circular segment, having the first edge 206 with the notches 212 along the inner circumferential diameter and the second edge 420 with the cutouts 416 along the outer circumferential diameter.

At block 808, the first and second longitudinal ends (208, 210), having the first and second interlocking geometries (322, 324), are mated (332) to form a circular laminate layer 924. In other embodiments, the first and second longitudinal ends (208, 210) do not have interlocking geometries, and the longitudinal ends are joined by a different process, such as welding, or the like. At block 810, the circular laminate layers 924 are stacked. For example, the circular laminate layers 924 may be transitioned to a take-up reel station 960 for stacking. When stacking, the dimple (414) protrusions on one layer may nest with the dimple (414) pockets on the adjacent layer to assist in alignment of the pilot holes 412.

At block 812, the stacked plurality of circulate laminate layers are joined to form a laminate disc 932. The joining may occur at the take-up reel station 960. Example methods of joining may include inserting a rivet through the aligned pilot holes 412, pressing the stacked layers via a tandem press, or the like. In another embodiment, the stacking of the layers of block 810 and the joining of block 812 may occur after finishing of the outer diameter discussed with block 814, with the finishing being accomplished on each laminate layer 924 individually. The finished laminate layers are then stacked (block 810) and joined (block 812).

At block 814, the outer diameter surface of the laminate disc 932 is finished. The finishing may be accomplished by a finishing tool 970. The laminate disc 932 may be rotated through a portion of the finishing tool 970 to apply the finished surface, whether smooth (e.g., 732-1), sawtooth (e.g., 732-2), or other finished surface.

As portions of the laminate disc 932 are manufactured, they may be moved between stations via transition tools 972 configured to attach to the manufacturing components (e.g., circular segments, laminate layers, and laminate discs). For example, the transition tool 972 may attach to a laminate layer 924 at the take-up reel station 960 and slide along the rails 974 to move the laminate layer 924 to the finishing tool 970.

The apparatus 900 depicts a single piece of inlet stock 902 being manufactured into separate laminate discs 932, one via a first process on the left and one via a second process on the right. In such an embodiment, the stamping tool 913 is configured to stamp separate lines of arc segments 904 for the left-side manufacturing process and the right-side manufacturing process. The left-side manufacturing process may be identical to the right-side manufacturing process, with the exception of some aspects being mirrored (e.g., wrapping counter clockwise on one side and wrapping clockwise on the other, and stamping aspects of the line of arc segments along an edge of the inlet stock or a centerline of the inlet stock).

However, one with skill in the art appreciates that the processes may be different. For example, the length of each line of arc segments may be different, resulting in different diameter laminate discs, the number of arc segments may be varied, different finishing surface may be applied to each outer circumferential diameter, the number of layers may vary in the laminate disc, joining methods may differ, and the like. Although the apparatus 900 depicts manufacturing two laminate discs 932 from the single inlet stock 902, it is appreciated that one with skill in the art may modify the apparatus 900 to produce a single laminate disc 932 from the inlet stock 902.

It is expected that the technology disclosed herein may find wide applicability in a wide range of areas such as, but not limited to, automotive, transportation, electronic, appliance, and other machine applications.

What is claimed is:

1. A method comprising:
    stamping an inlet stock of material to form a line of arc segments, the line of arc segments having:
        a plurality of notches along a first edge;
        a first longitudinal end; and
        a second longitudinal end opposite the first longitudinal end;
    wrapping the line of arc segments to form a circular segment having the first edge along an inner-circumferential diameter of the circular segment;
    joining the first longitudinal end to the second longitudinal end to form a circular laminate layer; and
    stacking a plurality of circular laminate layers to form a laminate disc.

2. The method of claim 1, wherein:
    the first longitudinal end comprises a first interlocking geometry;

the second longitudinal end comprises a second interlocking geometry complementary to mating with the first interlocking geometry, and joining the first and second longitudinal ends to form the circular laminate layer comprises mating the first interlocking geometry with the second interlocking geometry.

3. The method of claim 1, wherein:

the line of arc segments further comprises at least one pilot hole; and wrapping the line of arc segments further comprises securing the line of arc segments at a pilot hole in proximity to the first longitudinal end and pulling the line of arc segments by the secured pilot hole around a circular tool.

4. The method of claim 3, the method further comprises aligning the pilot holes in the stacked plurality of circular laminate layers and inserting a rivet through the aligned pilot holes.

5. The method of claim 1, wherein;

the line of arc segments further comprises at least one dimple that forms a protrusion on one side and a pocket on an opposing side; and stacking the plurality of circular laminate layers comprises aligning a protrusion on a first laminate layer with a pocket of a second laminate layer adjoining the first laminate layer.

6. The method of claim 5, wherein stacking the plurality of laminate layers comprises aligning the joined first and second longitudinal ends of the first laminate layer with the joined first and second longitudinal ends of the second laminate layer.

7. The method of claim 5, wherein stacking the plurality of laminate layers comprises rotationally offsetting the joined first and second longitudinal ends of the first laminate layer with the joined first and second longitudinal ends of the second laminate layer.

8. The method of claim 1, wherein the line of arc segments further comprises a plurality of cutouts along a second edge opposite of the plurality of notches, the second edge forming an outer circumferential diameter of the circular segment.

9. The method of claim 1, the method further comprising pressing together the laminate disc.

10. The method of claim 1, the method further comprising finishing an outer circumferential diameter of the laminate disc.

11. A laminate disc comprising a plurality of stacked circular laminate layers, each layer in the plurality of stacked circular laminate layers is formed by:

stamping an inlet stock of material to form a line of arc segments, the line of arc segments having:
a plurality of notches along a first edge;
a plurality of cutouts along a second edge that opposes the first edge, the plurality of cutouts located opposite of the plurality of notches;
at least one pilot hole;
a first longitudinal end; and
a second longitudinal end opposite the first longitudinal end;

forming the line of arc segments into a circular segment at least in part by:

securing the line of arc segments at a pilot hole located in proximity to the first longitudinal end; and pulling the line of arc segments by the secured pilot hole around a circular tool such that the first edge forms an inner-circumferential diameter of the circular segment and the second edge forms an outer-circumferential diameter of the circular segment; and joining the first longitudinal end to the second longitudinal end to form a circular laminate layer.

12. The laminate disc of claim 11, the line of arc segments further comprising at least one dimple that forms a protrusion on one side and a pocket on an opposing side;

wherein:
a protrusion on a first circular laminate layer aligns with a pocket on a second circular laminate layer adjoining the first circular laminate layer; and
a pilot hole of the first circular laminate layer aligns with a pilot hole of the second circular laminate layer, such that the aligned pilot holes are configured to receive a fastener.

13. The laminate disc of claim 12, wherein the joined first and second longitudinal ends of the first circular laminate layer are rotationally offset from the joined first and second longitudinal ends of the second circular laminate layer.

14. The laminate disc of claim 11, further comprising a finished outer surface.

15. A method comprising:

stamping an inlet stock of material to form a line of arc segments, the line of arc segments having:
a plurality of notches along a first edge;
a plurality of cutouts along a second edge opposing the first edge, the plurality of cutouts located opposite of the plurality of notches;
at least one pilot hole;
at least one dimple that forms a protrusion on one side of the line of arc segments and a pocket on an opposing side of the line of arc segments;
a first longitudinal end; and
a second longitudinal end opposite the first longitudinal end and mateable with the first longitudinal end;

securing the line of arc segments at a pilot hole located in proximity to the first longitudinal end;

pulling the line of arc segments around a circular tool to form a circular segment, such that the first edge forms an inner-circumferential diameter of the circular segment and the second edge forms an outer-circumferential diameter of the circular segment;

mating the first longitudinal end to the second longitudinal end to form a circular laminate layer;

stacking a plurality of circular laminate layers by aligning a dimple protrusion on a first laminate layer with a dimple pocket of a second laminate layer;

joining the stacked plurality of circular laminate layers to form a laminate disc; and finishing an outer diameter of the laminate disc at least in part by notching a saw-tooth pattern on the outer diameter of the laminate disc.

16. The method of claim 1, wherein the line of arc segments comprises a plurality of arc segments in a continuous line.

* * * * *